Dec. 16, 1952     D. A. ALSBERG ET AL     2,622,127
INDICATING APPARATUS
Filed Dec. 14, 1948     7 Sheets-Sheet 2
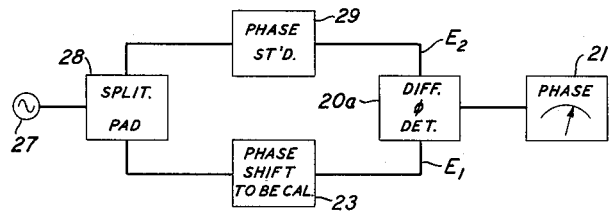
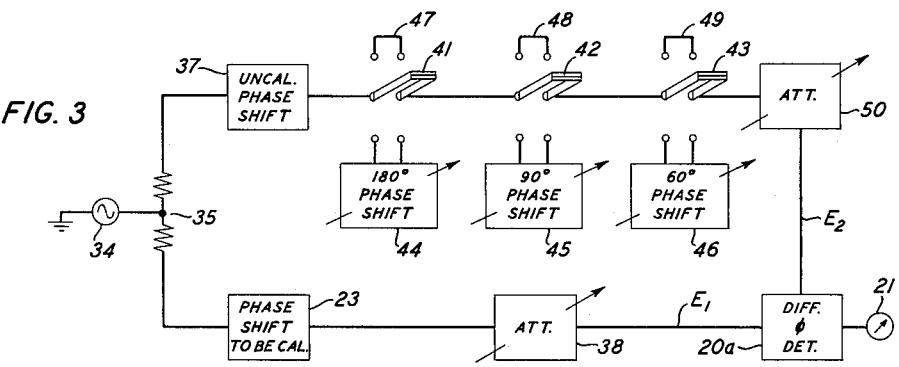
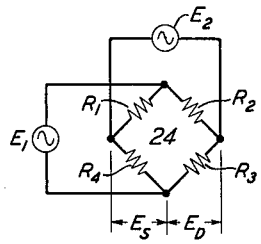
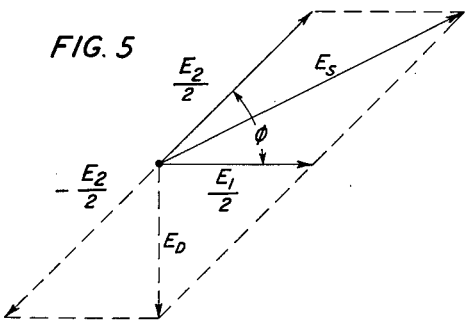
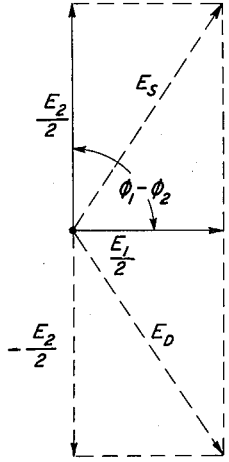
INVENTORS: D. A. ALSBERG
R. P. MUHLSTEFF
BY
Patrick J Roche
ATTORNEY Dec. 16, 1952     D. A. ALSBERG ET AL     2,622,127
INDICATING APPARATUS
Filed Dec. 14, 1948     7 Sheets-Sheet 4
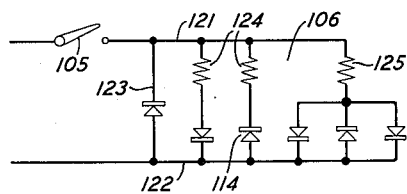
FIG. 9
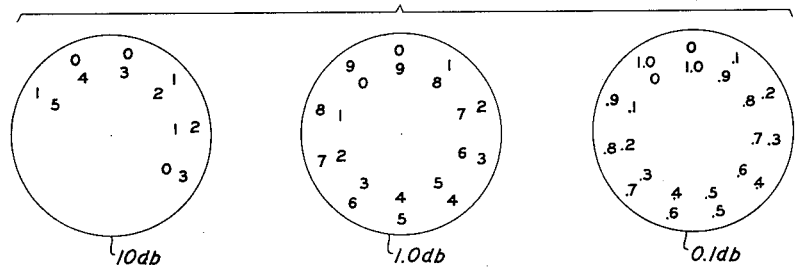
FIG. 10
FIG. 11
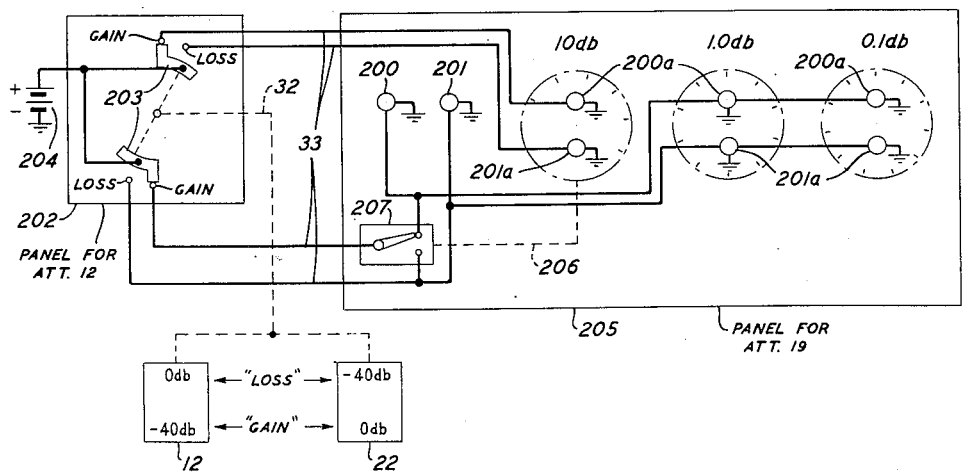
INVENTORS: D. A. ALSBERG
R. P. MUHLSTEFF
BY
Patrick J. Roche
ATTORNEY Dec. 16, 1952     D. A. ALSBERG ET AL     2,622,127
INDICATING APPARATUS
Filed Dec. 14, 1948     7 Sheets-Sheet 5
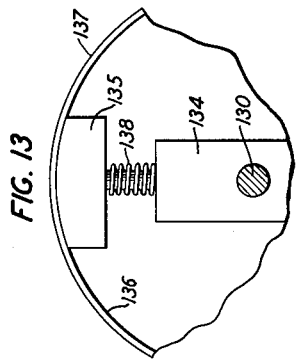
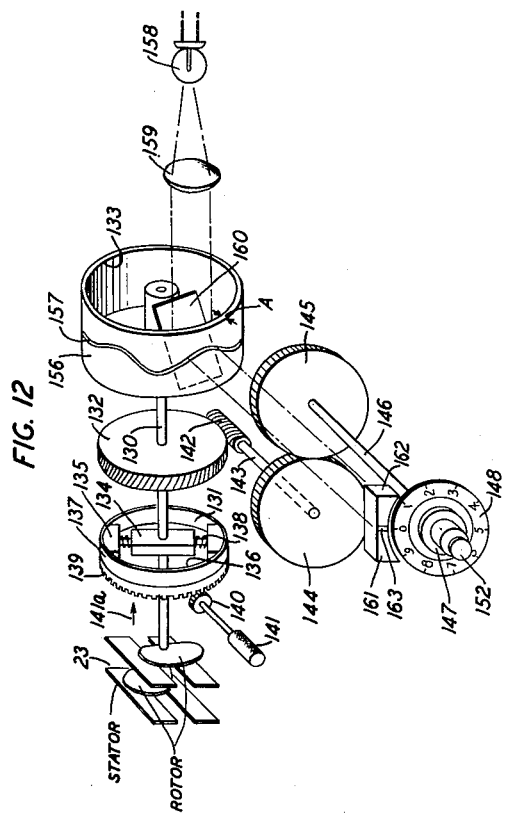
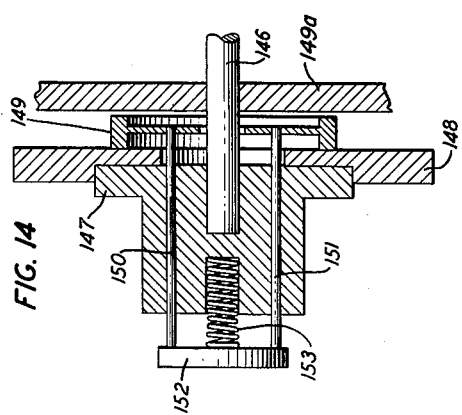
INVENTORS: D. A. ALSBERG
R. P. MUHLSTEFF
BY
Patrick J. Roche
ATTORNEY Dec. 16, 1952 D. A. ALSBERG ET AL 2,622,127
INDICATING APPARATUS
Filed Dec. 14, 1948 7 Sheets-Sheet 6

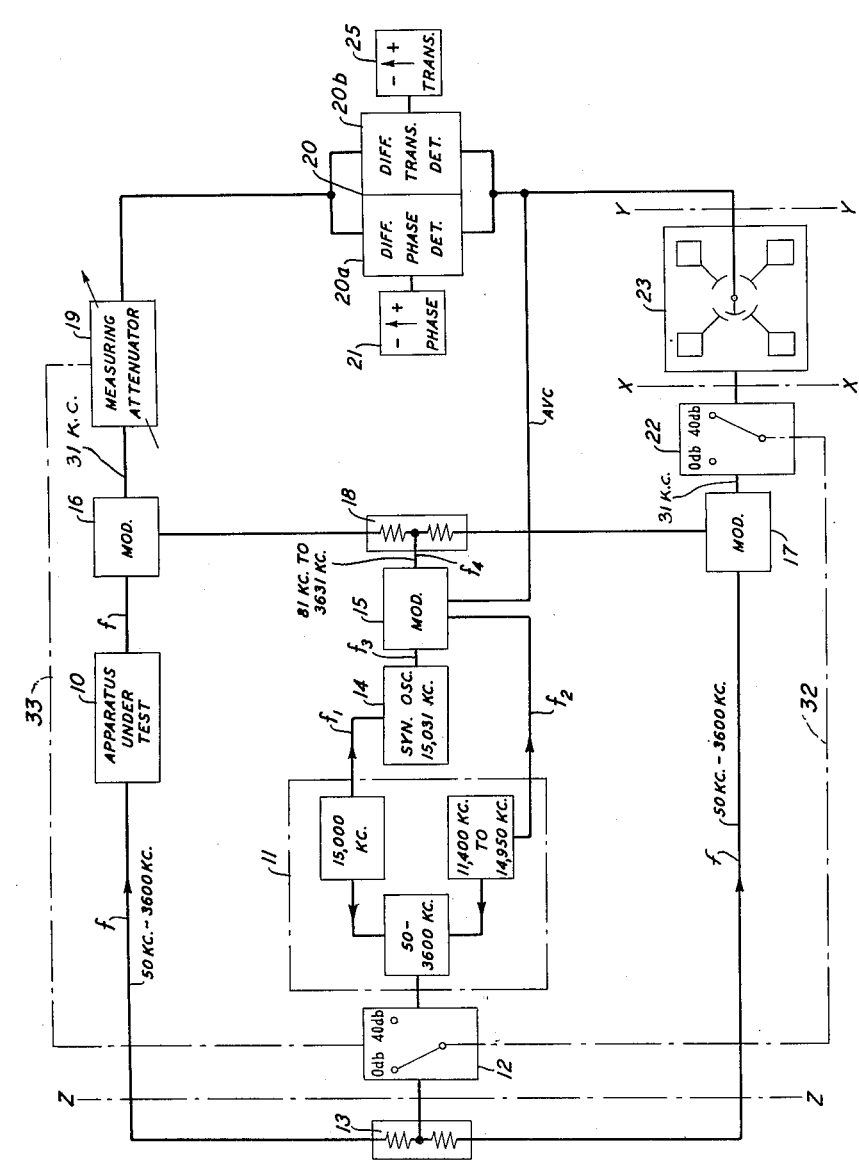

INVENTORS: *D. A. ALSBERG*
*R. P. MUHLSTEFF*
BY
*Patrick J. Roche*
ATTORNEY

Dec. 16, 1952  D. A. ALSBERG ET AL  2,622,127
INDICATING APPARATUS

Filed Dec. 14, 1948  7 Sheets-Sheet 7

INVENTORS: D. A. ALSBERG
R. P. MUHLSTEFF
BY Patrick J. Rocks
ATTORNEY

Patented Dec. 16, 1952

2,622,127

UNITED STATES PATENT OFFICE 2,622,127

INDICATING APPARATUS

Dietrich A. Alsberg, Berkeley Heights, N. J., and Robert P. Muhlsteff, New York, N. Y., assignors to Bell Telephone Laboratories, Incorporated, New York, N. Y., a corporation of New York Application December 14, 1948, Serial No. 65,203

10 Claims. (Cl. 175—183)

This invention relates to a method of and system for measuring the phase shift and the transmission of electrical apparatus, and more specifically to a movable index for use in such measuring method and system. While the invention is described in connection with measuring apparatus, it has other applications as will be hereinafter mentioned.

One known type of circuit for measuring the insertion phase shift of an apparatus under test involved the procedure of (a) firstly, substituting a short circuit for the apparatus under test and then adjusting a calibrated phase shifter of the circuit until a zero reading was provided on a suitable indicator whereupon the phase shifter would show A degrees; and secondly, replacing the short circuit with the apparatus under test and then adjusting the calibrated phase shifter until the zero reading was reestablished on the indicator whereupon the phase shifter would now read B degrees. The insertion phase shift of the apparatus under test would then be (B—A) degrees. Such subtraction was cumbersome and tended toward algebraic errors on the part of the operating personnel. Also, in the past, one phase shifter was used to provide the A reading, and therefore a second phase shifter was required to establish a direct indication of the (B—A) reading.

Now, let it be assumed that there has been devised a perfect phase shifter calibrated with a linear scale and variable continuously through 360 degrees by rotation of a shaft. Such linear scale could be coaxially mounted with the shaft and adjusted in position independently thereof. The initial zero balance of the system could then be established by moving the shaft of the phase shifter through A degrees, and thereafter rotating the linear scale until its zero point corresponds exactly with a fixed index serving as a reference point. Thereafter, when the circuit with the assumed phase shifter and linear scale is utilized to measure the insertion phase shift of the apparatus under test, the linear scale will directly indicate such phase shift, i. e., the former (B—A) reading. As a practical matter, however, a perfectly linear phase shifter has not yet been devised. A residual error which can be expressed as the deviation from perfect linearity is always present in the phase shift calibration. If such deviation were incorporated in the scale, the latter would become non-linear. As a consequence, it would be no longer possible to move the scale relative to the phase shifter shaft, as such movement would destroy the calibration.

The present invention contemplates a direct reading system with linear scales for measuring phase shift continuously through 360 degrees by utilizing a movable index for automatically compensating such system for deviations from linearity.

The main object of the invention is to provide a system for directly indicating phase measurements.

Another object is to provide a movable index for a direct-reading phase measuring system having linear scales.

A further object is to provide a direct-reading phase measuring system with an over-all zero at which the measuring scales thereof are adjustable to zero to represent the over-all system zero.

A further object is to derive a primary standard of phase shift which is submultiple of 360 degrees.

Another object is to provide a direct-reading phase measuring system with a fixed correction curve for residual error but with scales adjustable relative to the fixed correction curve.

Another object is to provide calibrated apparatus with a movable index for indicating its deviation from a predetermined scale.

Another object is to simplify the utilization of moving indices with calibrated apparatus.

In a specific embodiment, the invention comprises a photographic film containing a correction curve for the residual error of electrical measuring apparatus say, for example, a calibrated phase shifter comprising a condenser adjustable continuously through 360 degrees by the movement of a rotor controlled by the rotation of a shaft. The film is mounted in a predetermined position on the periphery of a transparent drum which is fixedly mounted coaxially with the phase shifter shaft. A beam of light passed through the drum and a portion of the correction curve thereon is projected onto a screen disposed adjacent a linearly calibrated fine scale connected to the shaft and representing one division of a second linearly calibrated coarse scale mounted coaxially with the shaft. The projected beam of light moves back and forth on the screen to the right or left of a central point amounts corresponding to the residual error of the phase measuring apparatus at different positions of its rotor through the 360 degrees' shift effected thereby, such central point representing no residual error. The fine scale is read against the light projection on the screen which constitutes a movable index therefor.

A feature concerns the use of a movable scale with a calibrated oscillator or other calibrated apparatus. Another feature involves the establishment of a primary standard of phase shift, which is a submultiple of 360 degrees, and its transfer to apparatus to be calibrated.

A feature includes the provision of a direct-reading phase measuring system having linear scales and an automatic compensation for the residual error thereof. Another feature is that a change of calibration necessitates only a removal of the old film containing the correction curve for enabling the automatic compensation for the residual error of the system and the replacement thereof with a new film bearing the new correction curve. Another feature concerns the initial establishment of a fixed relationship between the correction curve and rotor of the phase shifter whereby the coarse and fine scales thereof may be adjusted to different relative positions therebetween without disturbing the initial relationship of the correction curve and phase shifter. Another feature involves the establishment of a zero condition in the over-all phase measuring system whereat the coarse and fine scales of the phase shifter can be adjusted to zero reading without adversely affecting the relationship between the correction curve and phase shifter. A further feature is that the direct-reading aspect reduces the tendency of operating personnel to make errors in the algebraic computations required by prior art phase measuring systems.

The invention will be readily understood from the following description when taken together with the accompanying drawing in which:

Fig. 1 is a box diagram of a system for measuring the transmission and phase characteristics of an unknown apparatus;

Fig. 1A is a circuit modification that may be substituted in Fig. 1;

Fig. 2 is a box diagram showing a conventional arrangement for calibrating, with reference to a standard phase shifter, a phase shifter used in Fig. 1;

Fig. 3 is a box diagram showing an arrangement for calibrating, with reference to an absolute standard of phase, a phase shifter used in Fig. 1;

Fig. 4 is a schematic circuit showing a fundamental concept of the differential phase detector used in Fig. 1;

Figs. 5 and 6 are vector diagrams of certain phase relationships obtainable in Fig. 4;

Fig. 9 is a schematic circuit of an arrangement for providing the phase and transmission indicators in Figs. 1, 7 and 8, with coarse and fine scales;

Fig. 10 illustrates the dial arrangement for the calibrated attenuator used in Fig. 1;

Fig. 11 is a schematic circuit showing an illuminating arrangement used for measuring gain and/or loss in Fig. 1;

Figure 15:
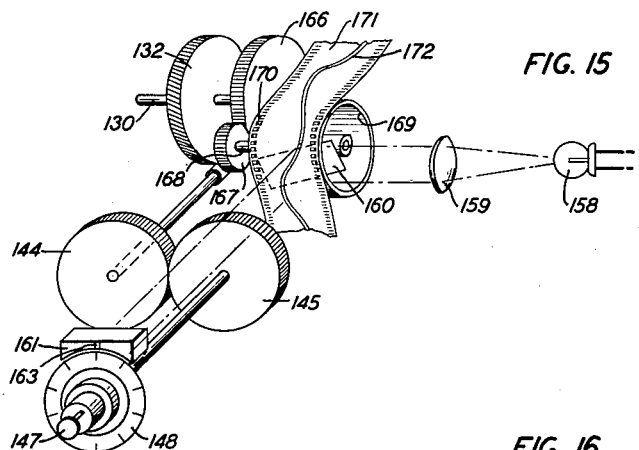
Figure 16:
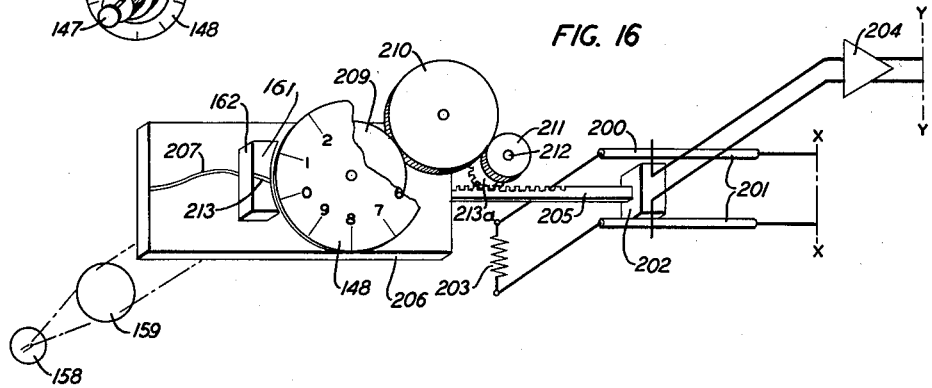
Figure 17:
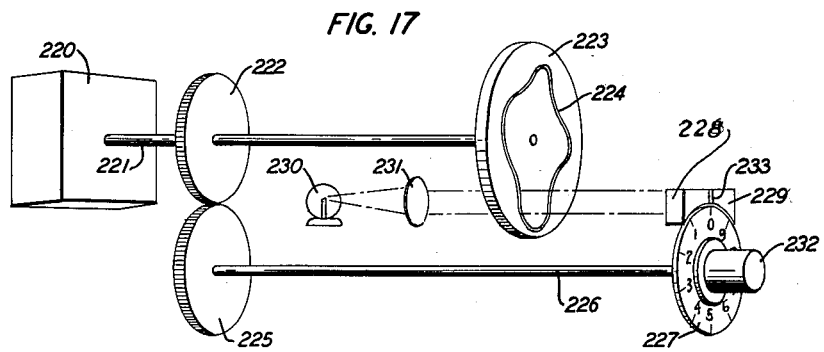
Figure 18:
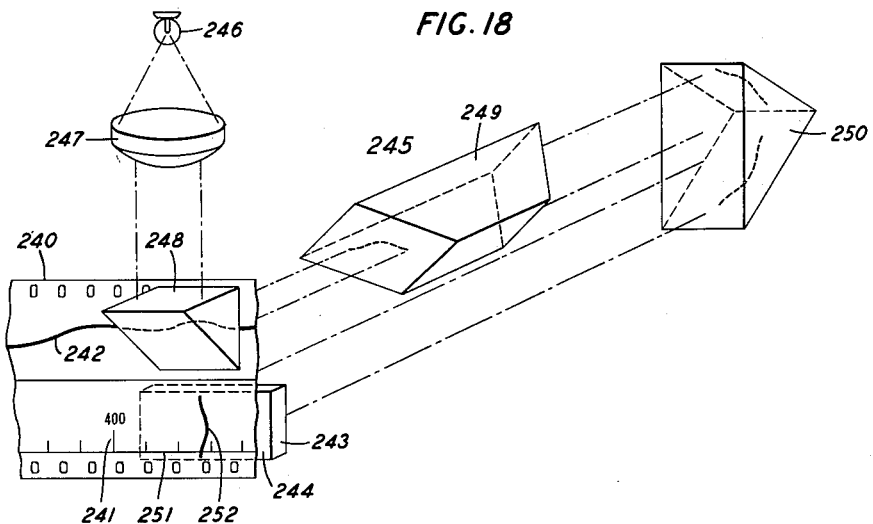

Figs. 12, 13 and 14 delineate mechanical arrangements of an optical cam associated with a phase shifter in Fig. 1;

Fig. 15 is a modification of the arrangement shown in Fig. 12;

Fig. 16 is an alternate embodiment of the optical system shown in Fig. 12 and usable in Fig. 1;

Fig. 17 shows an optical system associated with a one scale measuring system;

Fig. 18 is another embodiment of an optical system usable in Fig. 2; and

Figure 19:
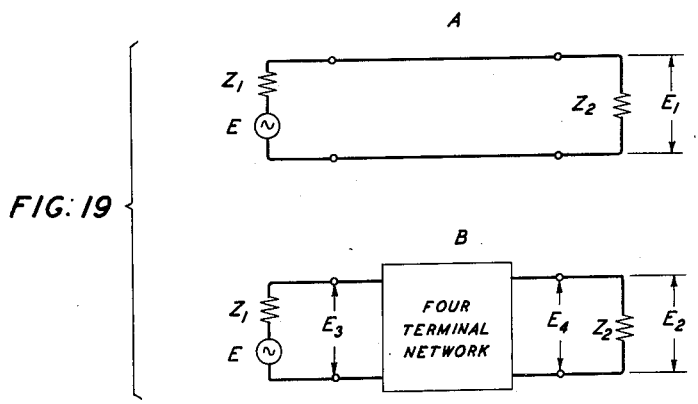

Fig. 19 are schematic circuits defining measurements obtainable with Fig. 1.

In the following description identical reference numerals are utilized to identify the same elements appearing in the several figures of the drawing.

OVER-ALL MEASURING CIRCUIT

Fig. 1 illustrates a system for measuring insertion phase shift and transmission through unknown apparatus under test 10 and may be modified by substituting Fig. 1A to the left of line 2—2 in Fig. 1 for measuring transfer transmission and transfer phase shift. Insertion phase shift and transfer phase shift difference may be defined by referring to Fig. 19 in which Fig. 19A comprises a source of voltage E having an impedance $Z_1$ and connected to load $Z_2$ across which is a voltage $E_1$; and Fig. 19B comprises a source of voltage E having an impedance $Z_1$ and connected to the input terminals of a generalized four-terminal network whose output terminals are connected to load $Z_2$ across which is voltage $E_2$. A voltage $E_3$ occurs across the input terminals of the four-terminal network; and a voltage $E_4$ appears across the output terminals of the latter network. Insertion loss and gain is defined as the ratio of voltage $E_1$ to voltage $E_2$ in Figs. 19A and B; insertion phase shift is defined as the difference in phase between voltages $E_1$ and $E_2$ in Figs. 19A and B. Transfer transmission is defined as the ratio of voltage $E_3$ to voltage $E_4$; and transfer phase difference is defined as the difference in phase shift between voltages $E_3$ and $E_4$.

In the system of Fig. 1, an oscillator 11 of well-known design supplies (1) a testing signal $f$ of a frequency varying from 50 kilocycles to 3,600 kilocycles through an attenuator 12 to a resistance splitting pad 13; (2) a second signal $f_1$ having a fixed frequency of 15,000 kilocycles to a synchronized oscillator 14; and (3) a third signal $f_2$ varying in frequency from 11,400 kilocycles to 14,950 kilocycles to one input modulator 15. The oscillator 14 also supplies to a second input of modulator 15 a signal $f_3$ having a fixed frequency of 15,031 kilocycles as disclosed in the copending application of D. Leed, Serial No. 65,130, filed December 14, 1948.

The splitting pad 13 is so arranged as to divide the testing signal $f$ into two equal voltage portions of which one portion is supplied through the apparatus under test 10 to the input of a modulator 16 while the second portion is supplied directly to a modulator 17, both modulators being of a familiar design. The second inputs of modulators 16 and 17 are also supplied from the output of modulator 15 and through an attenuator 18 with waves $f_4$ whose frequencies vary from 81 kilocycles to 3,631 kilocycles. The output of modulator 16 is supplied through a calibrated attenuator 19 to the unknown input, as the test signal of the unknown branch, of a differential detector 20 comprising a differential phase detector 20a whose output is connected to a phase indicator 21 and a differential transmission detector 20b whose output is connected to a differential transmission indicator 25 for effecting phase and transmission measurements, respectively, of the apparatus under test 10.

The output of modulator 17 is supplied through attenuator 22, calibrated phase shifter 23 to the standard input, as the test signal of the standard path, of the differential detector 20. An AVC connection extends from the output of differential transmission detector 20b, Figs. 1 and 8, to modulator 15, Fig. 1, for a purpose that will be hereinafter mentioned. The differential detector 20 and indicators 21 and 25 will also be hereinafter explained in connection with Figs. 7, 8 and 9. A mechanical connection 32 extends between attenuators 12 and 22, and an electrical connection 33 extends between attenuators 12 and 19 for purposes that will appear hereinafter.

CALIBRATION OF PHASE SHIFTER 23 IN FIG. 1

For the purpose of achieving a measurement of the insertion phase shift of the apparatus under test 10 in Fig. 1, there is employed a phase shifter 23 of the well-known four-quadrant type having a rotor for varying phase continuously through 360 degrees as illustrated in Fig. 12. In this connection it will be understood that other well-known types of phase shifters could be alternately utilized. As a perfectly linear phase shifter is normally unobtainable, it is necessary to calibrate the phase shifter 23 in order to note the deviations from linearity through 360 degrees as occasioned by residual error therein.

In this connection, an elementary circuit shown in Fig. 2 for calibrating phase shifter 23 will be initially considered. Referring to Fig. 2, a generator 27 of signal waves having a predetermined frequency is connected to a splitting resistance pad 28 from whose output one portion is applied through a phase shift standard 29 to the standard input of a differential phase detector 20a. The other output portion from splitting pad 28 is applied through phase shifter 23, which is to be calibrated, to the unknown input of the differential detector 20a. A suitable indicator 21 connected to the output of differential phase detector 20a measures the difference between the vectorial sum and difference of the standard and unknown voltages applied to the input thereof as will be described in detail hereinafter. Thus, the phase shifter 23 may be calibrated in an obvious manner by comparison with the standard phase shifter 29 in order to ascertain the deviation from linearity of the phase shifter 23 at each point in the calibration through 360 degrees.

Heretofore, the phase shift standard 29 in Fig. 2 was defined by 1, measuring the reactance and the resistance of a "standard" network and computing phase shift from such measurements; 2, using the sum and difference method of phase measurement which defines phase shift in terms of voltage ratios; 3, utilizing a measurement of portions of a wavelength such as possible with lecher wires; and 4, pulse measuring devices. A difficulty with all such prior arrangements was that inaccurate measurements tended to result as the measuring frequency increased.

Instead of using a derived standard phase shifter 29 as in Fig. 2, an absolute standard of phase may be determined by use of the circuit shown in Fig. 3. This determination is absolute or "primary" in the sense that phase shift is defined directly without reliance on external standards defined by frequency, or reactance, etc., such, for example, as in the case of the standard phase shifter 29 in Fig. 2.

The arrangement of Fig. 3 about to be described is not limited by frequency, and is equally effective at a frequency of 10 cycles as well as at the frequency of 1,000 megacycles or higher. To effect the phase determination of Fig. 3, it is only necessary that the frequency of the testing oscillator be substantially stable; that the detector, auxiliary networks and the apparatus to be calibrated be sufficiently stable; and that the error due to cross-talk and pick-up in the system involved be sufficiently small.

The basic method of Fig. 3 is one of successive approximation and is most readily comparable to the problem of subdividing a circle with a compass. Let it be supposed that the circumference of a circle is to be subdivided into three equal arcs, each of 120 degrees. First, a starting point on the circumference of the circle is arbitrarily selected and then the compass is adjusted to span 120 degrees. Commencing at the arbitrary starting point, three steps are measured off on the circumference of the circle with the compass. Assuming the compass spans exactly 120 degrees, the third step would return to the arbitrary starting point. If not, the spread of the compass is changed and the attempt to subdivide the circumference of the circle into the three equal arcs is repeated in a series of approximations until finally the arbitrary starting point is reached. Then, each 120-degree arc is divided into three equal arcs, each of 40 degrees. Thus, effecting the subdivisions by a factor 3 tends to reduce the cumulative error which would tend to be present if the subdivision of the circumference were attempted by a higher factor say 9, for example.

In the circuit of Fig. 3, a generator 34 of signals having a predetermined frequency is connected through a splitting pad 35 having one terminal connected to a phase shifter 23 to be calibrated and its opposite terminal connected to a continuously variable uncalibrated phase shifter 37. The phase shifters 23 and 37 are continuously adjustable through 360 degrees, the former having its output applied through a variable attenuator 38 to one input of differential phase detector 20a whose output is connected to phase indicator 21. The output of phase shifter 37 is connected through double-pole double-throw switches 41, 42 and 43 in tandem, with which are associated adjustable phase shift networks 44, 45 and 46, respectively, and short-circuiting straps 47, 48 and 49, respectively, and a variable attenuator 50 to a second input of the phase sensitive detector 20a. The networks 44, 45 and 46 are adjustable to provide phase shift to the amounts of 180 degrees, 90 degrees and 60 degrees, respectively.

The differential phase detector 20a is relatively insensitive to the amplitude variations of the two voltage inputs thereto but highly sensitive to unequalities of the vectorial sum and difference of the two voltage inputs thereto. The phase indicator 21 displays phase shift on a direct-reading scale in the following manner: The equation for indicator 21 is $$D = AF(\Phi) \tag{1}$$

where D is the deflection; A is a scale factor; and $F(\Phi)$ is the phase law of differential phase detector 20a. If a scale conforming to Equation 1 is affixed to indicator 21, such scale will indicate phase shift correctly if the scale factor A were adjusted to the proper value.

In the operation of Fig. 3 for the purpose of calibrating phase shifter 23, the signal generator 34 is adjusted to the desired predetermined frequency, at which the phase shifter 23 is to be calibrated, such frequency being 31 kilocycles for the purpose of this explanation. Attenuators 38 and 50 are so adjusted as to permit differential phase detector 20a to operate at its proper level of input voltages. As a first step, the phase shifter 23 is initially set at an arbitrary starting point. Then, with switches 41, 42 and 43 connected to their short-circuiting straps 47, 48 and 49, respectively, the phase shifter 37 is adjusted to provide a zero reading on indicator 21. Now, switch 41 is connected to phase shifter 44 with the switches 42 and 43 remaining in their aforementioned positions, and the phase shifter 23 is adjusted until a zero reading is again established on indicator 21. Switch 41 is again connected to the short-circuiting strap 47, and phase shifter 37 is adjusted to establish a phase change in the same sense or direction as the next preceding phase change effected by phase shifter 23 until a zero reading is re-established on the indicator 21. Then switch 41 is reconnected to phase shifter 44, and phase shifter 23 is adjusted in the same sense as in its next preceding adjustment until a zero reading is again established on indicator 21. If the actual phase shift occurring upon the throwing of switch 41 from its short-circuiting strap 47 to the phase shifter 44 were exactly 180 degrees, then phase shifter 23 should have returned to the initial arbitrary starting point.

Ordinarily such exact occurrence will not be the case. Now, estimating the amount of phase shift by which the return to the initial arbitrary starting point in the calibration of phase shifter 23 was missed as indicated by line scale 148, Fig. 12, the phase shifter 44 is adjusted by about one-half such estimated amount, and the foregoing procedure for calibrating phase shifter 23 is repeated. In successive repetitions of the above calibrating procedure, the amount of phase shift by which the initial arbitrary starting point on phase shifter 23 was missed will be progressively reduced until such amount is no longer discernible. Thus, an "absolute" 180-degree phase standard is obtained; and a phase shift of 180 degrees from the initial arbitrary starting point on phase shifter 23 is established from the first step of the calibration. Thus, the phase shifter 23 now has the two calibrated points of 0 degree and 180 degrees.

As a second step in the calibration of phase shifter 23, the latter is returned to the initial arbitrary starting point, the switches 41, 42 and 43 are connected to the short-circuiting straps 47, 48 and 49, respectively, and the phase shifter 37 is adjusted to provide zero reading on indicator 21. Next, switch 42 is connected to phase shifter 45, and the phase shifter 23 to be calibrated is adjusted in the same sense or direction as it was in the next previous adjustment thereof until the zero reading is returned to indicator 21. Then, switch 42 is reconnected to its short-circuiting strap 48, and phase shifter 37 is adjusted until a zero reading is provided on indicator 21. Again switch 42 is connected to phase shifter 45, and phase shifter 23 is adjusted in the same sense or direction as its next previous adjustment until a zero reading is established on indicator 21. If the relative phase shift of phase shifter 45 were exactly 90 degrees, the phase shifter 23 would have returned to the 180-degree point established via the first step of calibration. Ordinarily, this will not happen. Estimating the amount by which the return to the 180-degree point failed, the phase shifter 45 is varied by about one-half such amount, and the calibration procedure according to step 2 is repeated. From successive repetitions of this procedure, the amount of phase shift by which the 180-degree point was missed will be progressively reduced until such amount is no longer noticeable. Thus an "absolute" 90-degree phase standard is obtained. Following the basic procedural system described in above step 1, the calibration of phase shifter 23 is established for every possible permutation such, for example, as 0° ± 90°; and 180°±90°. The 90-degree and 270-degree points thus obtained are checked against each other with the "absolute" 180-degree phase standard obtained in step 1. Now the phase shifter 23 has the four calibrated points of 0 degree, 90 degrees, 180 degrees and 270 degrees.

As a third step in the calibration of phase shifter 23, the basic procedure of step 1 is now utilized with switch 43 and the 60-degree phase shifter 46 associated therewith to subdivide each of the four 90-degree divisions, heretofore established on phase shifter 23, into three 30-degree divisions. Upon the completion of the third step of calibration, the phase shifter 23 will include twelve points of 30 degrees, viz., 0 degree; 30 degrees; 60 degrees; 90 degrees; 120 degrees; 150 degrees; 180 degrees; 210 degrees; 250 degrees; 270 degrees; 300 degrees; 330 degrees; and 360 degrees (or 0 degree).

Obviously a progression of submultiples of 30-degree phase shifters, not shown, could be used to subdivide each 30-degree section. However, it is convenient to utilize differential phase detector 20a and associated indicator 21 for such subdivision in the following manner. From Equation 1, $$D = AF(\Phi)$$

Adjustment of the scale factor A provides an effective range from +5 degrees to −5 degrees, or a 10-degree phase shift standard, which, when properly subdivided on the scale of indicator 21 enables a further subdivision of each of the above 30-degree sections of phase shifter 23.

As a fourth step in the calibration of phase shifter 23, the latter is set at the 30-degree point or a multiple thereof previously established; and then phase shifter 37 is adjusted until a −5 degree reading is established on indicator 21. Next, phase shifter 23 is adjusted to provide a +5 degree reading on indicator 21. Now, phase shifter 37 is adjusted to re-establish the −5 degree reading on indicator 21. This procedure is repeated twice until phase shifter 23 has been adjusted through 30 degrees to the next adjacent point, which is a multiple of 30 degrees, as determined by indicator 21. If the scale factor A were correct the calibration should coincide exactly with the previously established 30-degree subdivision or multiple thereof. If the calibration and the 30-degree subdivision do not agree, the scale factor A is adjusted, and the foregoing procedure repeated until agreement is obtained. Thus, the phase indicator 21 may be utilized to establish two 10-degrees subdivision between each two adjacent points which are multiples of 30 degrees. Upon the completion of the fourth step of calibration, the phase shifter 23 includes the points 0 degree, 10 degrees, 20 degrees, 30 degrees, 40 degrees, ... 330 degrees, 340 degrees, 50 degrees, 360 degrees (or 0 degree).

As a fifth step in the calibration of phase shifter 23, the indicator 21 may be used in a manner similar to the fourth step to establish a 5-degree subdivision between each two adjacent 10-degree subdivisions. In this case the phase shifters 36 and 37 are adjusted between the readings of −5 degrees and 0 degree, or +5 degrees and 0 degree. At this state of calibration, the phase shifter 23 includes the points 0 degree, 5 degrees, 10 degrees, 15 degrees, 20 degrees, 25 degrees, . . . 340 degrees, 345 degrees, 350 degrees, 355 degrees, 360 degrees (or 0 degree). As a sixth step in the calibration of phase shifter 23, the indicator 21 may be utilized in the manner of the fourth and fifth steps to establish four 1-degree subdivisions between each two adjacent points that are multiples of 5 degrees. Upon the completion of the sixth calibration step, therefore, phase shifter 23 will include the points 0 degree, 1 degree, 2 degrees, 3 degrees, 4 degrees, 5 degrees, 6 degrees, 7 degrees . . . 354 degrees, 355 degrees, 356 degrees, 357 degrees, 358 degrees, 359 degrees and 360 degrees (or 0 degree). In a practical case, it was found that calibration to 0.1 degree for each multiple of 5 degrees was satisfactory.

Thus, the circuit of Fig. 3 shows the only components essential to the calibration system, viz., 1, a phase shifter to be calibrated; 2, a plurality of phase shift networks adjustable to the multiples desired in the calibration; 3, an uncalibrated phase shifter continuously adjustable through 360 degrees; and 4, a detector including an indicator for identifying one arbitrary phase relationship, viz., quadrature, between two alternating voltages as will be subsequently explained in connection with Fig. 7.

TRANSMISSION AND PHASE DETECTOR 20 IN FIG. 1

The purpose of the differential phase detector 20a shown in Figs. 1, 2 and 3, respectively, is to identify an arbitrary phase relationship, quadrature, between two alternating voltages and comprises a phase discriminator 24 that will now be described in connection with Figs. 4, 5 and 6. A characteristic of phase discriminator 24 is that it shall be substantially insensitive to amplitude variations of the two input voltages whose relative phase is to be compared. The differential discriminator 24 shown in Fig. 4 is essentially a Wheatstone bridge comprising four arms of equal resistors, and having each of its two opposite diagonals connected to one of the two input voltages $E_1$ and $E_2$ whose relative phase is to be compared. The general phase relationship between the two input voltages $E_1$ and $E_2$ to the bridge in Fig. 4 is illustrated in Fig. 5.

Let it be assumed that $$E_1 = \sin(\omega t + \Phi_1)$$
$$E_2 = \sin(\omega t + \Phi_2)$$

Using complex vectorial notation $$E_1 \sin(\omega t + \Phi_1) = E_1 e^{j\Phi_1}$$
$$E_2 \sin(\omega t + \Phi_2) = E_2 e^{j\Phi_2}$$

then, $$E_S = \frac{1}{2}(E_1 e^{j\Phi_1} + E_2 e^{j\Phi_2})$$

$$E_D = \frac{1}{2}(E_1 e^{j\Phi_1} - E_2 e^{j\Phi_2})$$

Let $\Phi_1 = 0$ and $\Phi_2 = \Phi$. Then $$E_S = \frac{1}{2}(E_1 + E_2 e^{j\Phi}) \quad (2)$$

$$E_D = \frac{1}{2}(E_1 - E_2 e^{j\Phi}) \quad (3)$$

Hence for $$\Phi = \frac{\pi}{2} + n\pi$$

where $n$ is any integer including zero $$E_S = E_D$$

Thus, the amplitudes of the resultant voltages $E_S$ and $E_D$ are equal when the relative phase angle $\Phi$ is equal to 90 degrees, 270 degrees, 450 degrees, etc.; and are independent of the amplitudes of $E_1$ and $E_2$ as shown in Fig. 6.

The bridge phase discriminator 24 in Fig. 4 may be used as a deflection bridge wherein the resultant voltages $E_S$ and $E_D$ may be utilized to measure the relative phase thereof.

From Equations 2 and 3, $$E_S = \frac{1}{2}\sqrt{E_1^2 + 2E_1 E_2 \cos\Phi + E_2^2} \quad (4)$$

$$E_D = \frac{1}{2}\sqrt{E_1^2 - 2E_1 E_2 \cos\Phi + E_2^2} \quad (5)$$

Let amplitudes $E_1$ and $E_2$ be equal $$E_S = \frac{E_1}{2}\sqrt{2(1+\cos\Phi)} = E_1 \cos\frac{\Phi}{2}$$

$$E_D = \frac{E_1}{2}\sqrt{2(1-\cos\Phi)} = E_1 \sin\frac{\Phi}{2}$$

$$\frac{E_S}{E_D} = \cotan\frac{\Phi}{2} \quad (6)$$

Equation 6 represents the phase law governing the utilization of the bridge phase discriminator 24. From Equations 4, 5 and 6

$$\cotan\frac{\Phi + \Delta\Phi}{2} = \sqrt{\frac{E_1^2 + 2E_1 E_2 \cos\Phi + E_2^2}{E_1^2 - 2E_1 E_2 \cos\Phi + E_2^2}}$$

Hence, $$\frac{E_2^2}{E_1^2} + 2 \frac{1 + \cotan^2\frac{(\Phi+\Delta\Phi)}{2}}{1 - \cotan^2\frac{(\Phi+\Delta\Phi)}{2}} \frac{E_2}{E_1}\cos\Phi + 1 = 0 \quad (7)$$

From trigonometry $$\frac{1 + \cotan^2\frac{(\Phi+\Delta\Phi)}{2}}{1 - \cotan^2\frac{(\Phi+\Delta\Phi)}{2}} = -\frac{1}{\cos(\Phi+\Delta\Phi)} \quad (8)$$

Substituting Equation 8 in Equation 7, then $$\frac{E_2}{E_1} = +\frac{\cos\Phi}{\cos(\Phi+\Delta\Phi)} \pm \sqrt{\left(\frac{\cos\Phi}{\cos(\Phi+\Delta\Phi)}\right)^2 - 1}$$

Hence, $$20 \log \frac{E_2}{E_1} =$$
$$20 \log \left[\frac{\cos\Phi}{\cos(\Phi+\Delta\Phi)} \pm \sqrt{\left(\frac{\cos\Phi}{\cos\Phi(\Phi+\Delta\Phi)}\right)^2 - 1}\right] \quad (9)$$

If Equation 6 is used to determine the phase angle $\Phi$, and error $\Delta\Phi$ is incurred when $|E_1| \neq |E_2|$. The error $\Delta\Phi$ can be computed from Equation 9. As one illustration, a change of 5 degrees from the relative phase of 90 degrees between input voltages $E_1$ and $E_2$ requires a ratio of 1.75 decibels therebetween to produce an error $\Delta\Phi = 0.1°$.

The properties of the bridge phase discriminator 24 shown in Figs. 4, 5 and 6 may be summarized as follows:

1. Phase shifts of $$\Phi = \frac{\pi}{2} + n\pi$$

between two input voltage $E_1$ and $E_2$ will be distinguished regardless of the amplitudes of those voltages:

2. For relatively small departures from $$\Phi = \frac{\pi}{2} + n\pi$$

the relatively small amplitude differences between the input voltages E₁ and E₂ will cause relatively insignificant errors;

3. Although equality of the resultant voltages nominally exists every 180 degrees, this is only true when the four resistance arms in Fig. 4 are exactly equal. If those arms are unequal, balance will exist for all $$\Phi = \frac{\pi}{2} + 2n\pi + \Delta\theta_1$$

and $$\Phi = \frac{\pi}{2} + (2n+1)\pi + \Delta\Phi\theta_2$$

where $\Delta\theta$ is the departure angle from 90 degrees between input voltages E₁ and E₂; and 4. Either of the balance conditions mentioned in next preceding item 3 may be used to identify phase shifts in multiples of $2\pi$ exactly, regardless of imperfections in the phase discriminator. This meets the basic prerequisite for the absolute method of phase subdivision described above under "Calibration of phase shifter."

The bridge phase discriminator 24 according to Figs. 4, 5 and 6 is incorporated in the differential phase detector 20a shown in Figs. 7 and 8 which will now be explained. In Fig. 7, E₁ and E₂ represent two alternating voltages whose relative phase is to be measured. Voltage E₁ is applied through preamplifier 55 to the vertical diagonal of bridge phase discriminator 24; and voltage E₂ is applied through preamplifier 56 and transformer 57 to the horizontal diagonal of bridge phase discriminator 24. Output voltages Es and ED from the bridge phase discriminator 24 represent the vectorial sum and difference of voltages E₁ and E₂, at the bridge phase discriminator 24, and are applied through buffer amplifiers 58 and 59 of identical gain respectively, to a differential rectification system comprising solid rectifiers or unidirectional devices 60, 61, 62, and 63; capacitors 64, 65, 66 and 67; and resistors 68, 69, 70, 71, 72, 73, 74 and 75.

Figure 7:
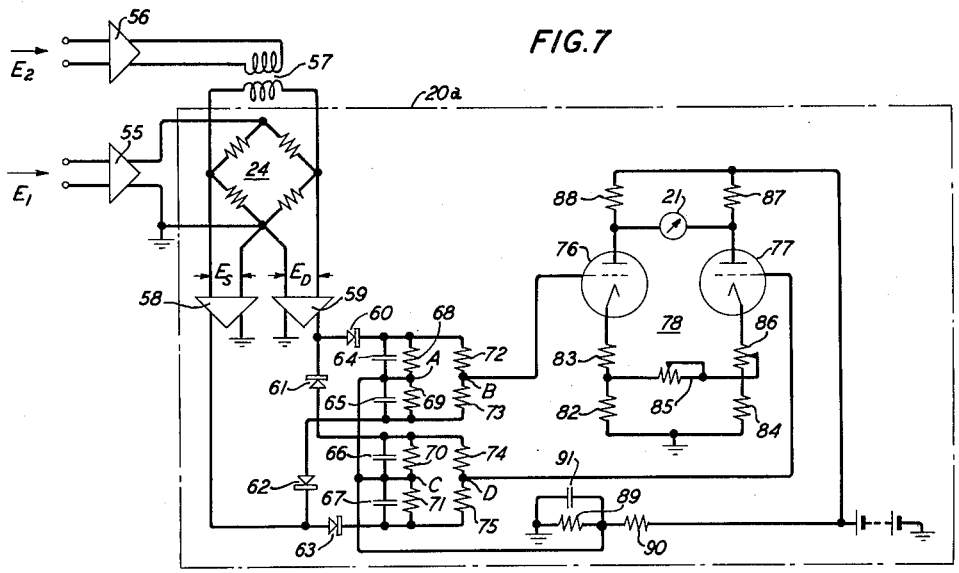
Fig. 7 is a schematic circuit showing the basic type of phase detector used in Fig. 1.

When the output voltages Es and ED from the phase discriminator 24 in Fig. 7 are equal, and assuming resistors 72, 73, 74 and 75 are equal, then no direct current potential will occur across the points A—B and C—D in the output of the differential rectifier system. When the output voltages E₁ and E₂ from the phase discriminator 24 are unequal, then direct current potentials will occur in output of the differential rectifier system across the points A—B and C—D in equal magnitudes but opposite phase, the latter being due to the poling of rectifiers 60, 61, 62 and 63. The magnitudes of the rectified voltages are proportional to the difference in magnitude between the voltages Es and ED. The rectified voltages are applied to the control grids of amplifier tubes 76 and 77 included in a differential direct current amplifier 78 comprising, in addition, a cathode feedback including fixed resistors 82, 83 and 84 and adjustable resistors 85 and 86; plate resistors 87 and 88, and a center-zero milliammeter serving as the previously-identified phase indicator 21. Resistors 89 and 90 provide biasing potentials for the control grids of amplifier tubes 76 and 77. Capacitor 91 provides a high frequency by-pass to ground at points C and A.

Adjustable resistor 86 is adjusted to establish the same flow of direct current through plate resistors 87 and 88 whereupon no current will flow through phase indicator 21 when the latter resistors are equal. Adjustable resistor 85 controls the amount of negative cathode feedback and thereby the gain of amplifiers 76 and 77 in equal amounts provided resistors 82 and 84 have the same amount of effective resistance.

Now, let it be assumed that buffer amplifiers 58 and 59 have the same gain. When the voltages Es and ED are unequal, rectified direct current voltages will appear across the points A—B and C—D to cause an unbalance in the amount of space current flowing in the direct current amplifiers 76 and 77. This will result in a flow of current in the phase indicator 21 whereby a corresponding deflection is produced on the scale thereof. If the scale were proportioned according to the scale law given in above Equation 1, and the factor of proportionality A were adjusted properly by varying resistor 85, the phase indicator 21 would show directly the change in phase from the quadrature relation of voltages E₁ and E₂ at the input of the bridge phase discriminator 24. Thus, the differential phase detector 20a in Fig. 7 provides an arrangement for identifying a definite phase relationship, viz., quadrature at the input of phase discriminator 24, between two alternating input voltages, and to indicate directly on suitably calibrated indicator 21 any change in such relationship.

Figure 8:
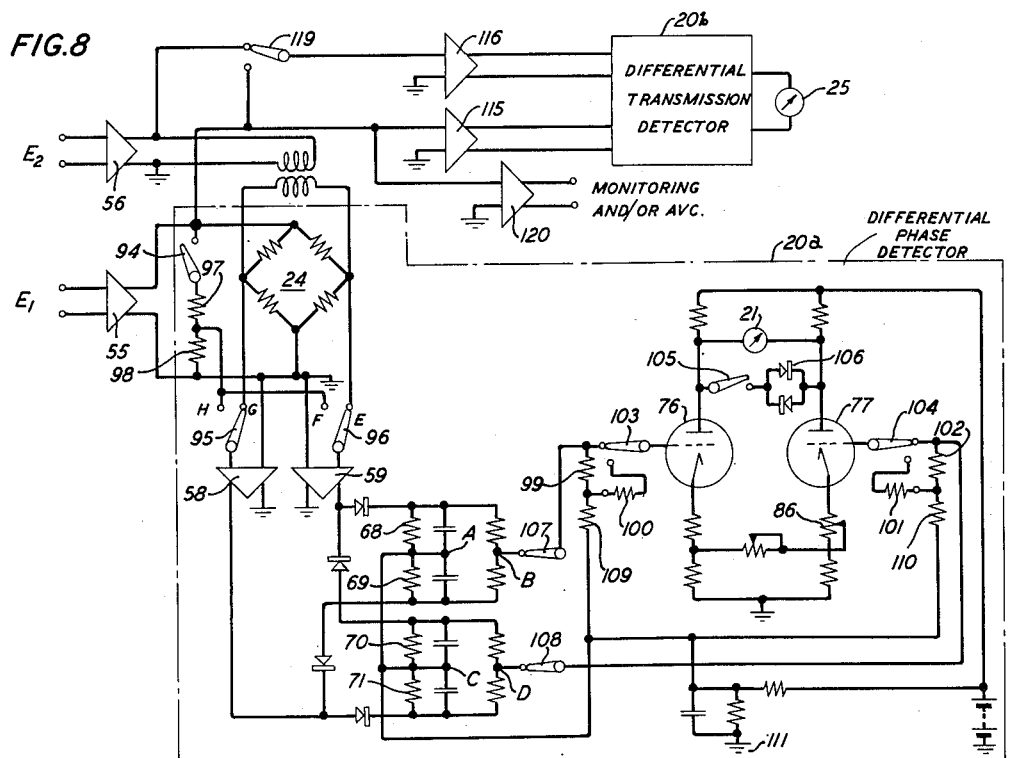
Fig. 8 is a modification of Fig. 7 and is a schematic circuit showing the differential detectors for measuring transmission and phase in Fig. 1.

Fig. 8 is essentially the same as Fig. 7 except the former includes certain features to be identified hereinafter for facilitating the use of Fig. 7.

Switches 107 and 108 serve to interrupt the signal voltages applied to the control grids of amplifier tubes 76 and 77 thereby permitting adjustment of resistor 86 to establish equal space currents through the amplifier tubes 76 and 77 as previously mentioned. Voltage dividers 99 and 109 and 110 and 102 serve to vary the sensitivity of differential amplifiers 76 and 77 via single-pole double-throw switches 103 and 104, respectively, whereby use of the "fine" and "coarse" scales of indicator 21 is permitted. For maximum sensitivity, the resistance of voltage dividers 99 and 109 and 110 and 102 must be high. Very small amounts of grid current in the amplifiers 76 and 77 flowing through the resistors of the respective grid circuits will develop corresponding grid biases. The amount of grid current flowing in the respective grid circuits may be the same or different depending on the characteristics of the respective amplifier tubes 76 and 77. To preclude change in bias and thereby the production of a false reading on the scale of phase indicator 21 when actuating switches 103 and 104 from the "fine" to the "coarse" scale of phase indicator 21, and vice versa, the resistance of the grid circuits must be kept constant. This is achieved by making the resistances of resistors 100 and 101 equal to that of resistors 99 and 102. As the voltage dividers 99 and 109 and 102 and 110 complete the direct current path from the points B and D to ground 111, the resistors 68, 69, 70 and 71 may be omitted in Fig. 8, if desired. Single-pole single-throw switch 105 enables a varistor 106 to be connected in shunt of indicator 21 whenever desired. The varistor 106 possesses high initial resistance for applied voltage of relatively low magnitude and decreasing resistance for applied voltages of increasing magnitude. Thus, the varistor 106 will be substantially ineffective as a shunt for relatively small deflections on the scale of phase indicator 21 but an effective shunt for larger deflections thereby permitting maximum sensitivity of phase indicator 21 for small departures from the quadrature relationship of input voltages $E_1$ and $E_2$, and low sensitivity of phase indicator 21 for large departures from such relationship. In the ideal case, it happens that $E_1 = E_2$, and $$E_S = E_D = \frac{E_1}{\sqrt{2}}$$

when the quadrature relation occurs between the input voltages $E_1$ and $E_2$. For the purpose of checking the circuit of Fig. 8, a single-pole single-throw switch 94 is closed, and single-pole double-throw switches 95 and 96 are moved to their contacts H and F, respectively. Via voltage divider 97 and 98, a voltage $$\frac{E_1}{\sqrt{2}}$$

is applied to the inputs of buffer amplifiers 58 and 59 and the gain thereof is adjusted until no voltage appears across the points A—B and C—D as shown by a zero deflection on indicator 21.

Referring again to Fig. 8, buffer amplifiers 55 and 56 are connected through buffer amplifiers 115 and 116, respectively, to the input of a differential transmission rectification system 20b which is identical with the differential phase rectification system hereinbefore described as connected to the output of amplifiers 58 and 59 and which has its output connected to an indicator 25 similar to the phase indicator 21 but calibrated in suitable transmission units. The differential transmission detector 20b and indicator 25 serve to measure the difference between the amplitudes of input voltages $E_1$ and $E_2$. Single-pole double-throw switch 119 enables the application of equal voltage inputs to buffer amplifiers 115 and 116. Buffer amplifier 120 provides a monitoring voltage which may be supplied to a meter, not shown, or which may be utilized for an automatic voltage control AVC in Fig. 1 as herein explained.

Fig. 9 shows in further detail the varistor 106 in Fig. 8 for the purpose of providing each of indicators 21 and 25 with a desired non-linear scale. Due to manufacturing variations of individual rectifiers, the individual rectifiers 114, as shown in Fig. 9, may be connected directly to leads 121 and 122 via a strap 123, or via individual trimmer resistors 124, or several rectifiers 114 may be connected through one trimmer resistor 125. The resistors 124 and 125 serve to adjust the characteristics of individual varistors 114.

OPERATION OF FIG. 1

(a) *For measuring loss or gain*

In the operation of Fig. 1, the apparatus under test 10 is tested with the testing waves $f$ which vary from 50 kilocycles to 3600 kilocycles, and which are supplied to one input of each of modulators 16 and 17. The other input of each of these modulators is supplied at the same time with the waves $f_4$ varying from 81 kilocycles to 3631 kilocycles. Hence, the outputs of modulators 16 and 17 include a component having a frequency of 31 kilocycles at which the phase and transmission characteristics of the unknown and standard paths are compared in the differential detector 20 and measured by the indicators 21 and 25 connected thereto.

The attenuators 12 and 22 are individually adjustable to one of the other of the two positions "0-decibel loss" and "40-decibel loss." These attenuators are connected together by the mechanical connection 32 in Figs. 1 and 11 so that when attenuator 12 is in the "0-decibel loss" position, the attenuator 22 is in the "40-decibel loss" position; and so that when attenuator 12 is in the "40-decibel loss" position, the attenuator 22 is in the "0-decibel loss" position.

For effecting a null operation of Fig. 1, "zero center" scales are provided on indicators 21 and 25; a —40-decibel input level is to be supplied to the differential detector 20 from each of the unknown and standard branches; the insertion phase shift of the apparatus under test 10 is read directly from the calibrated phase shifter 23; and the "loss" or "gain" of the apparatus under test 10 is read directly from calibrated attenuator 19.

The standard branch comprises as fixed transmission conditions (1) a 20-decibel gain in modulator 17, (2) a 20-decibel loss in phase shifter 23, and (3) a 40-decibel loss for either gain or loss measurements by means of (a) the "40-decibel loss" position effective in attenuator 22 when the "0-decibel loss" position is effective in attenuator 12 for loss measurements, or (b) the "40-decibel loss" position in attenuator 12 when the "0-decibel loss" position is effective in attenuator 22 for gain measurements. The unknown branch comprises as a fixed transmission condition (1) a +20-decibel gain in modulator 16; (2) a "0-decibel loss" or "40-decibel loss" due to position of attenuator 12 when effecting "loss" or "gain" measurements, respectively; (3) "gain" or "loss" of the apparatus under test 10; and (4) effective attenuation of calibrated attenuator 19. As a consequence, an effective 60-decibel loss should be present in each of the unknown or standard branches whereby the fixed conditions in each branch should add algebraically at all times to the two —40-decibel input levels to differential detector 20.

Assuming for the moment that (a) apparatus under test 10 is removed from the circuit of Fig. 1 and replaced with a suitable short-circuiting strap say, for example, a section of coaxial cable; (b) attenuator 12 is on the "0-decibel loss" point; and (c) attenuator 22 of the standard branch is on the "40-decibel loss," then calibrated attenuator 19 in the unknown branch will actually include a "60-decibel loss" to compensate for the +20-decibel gain of modulator 16 whereby a "—40-decibel" signal is applied to the unknown input of the differential detector 20. At the same time, the standard branch will include "+20-decibel gain" in modulator 17, "20-decibel loss" in phase shifter 23, and "40-decibel loss" in attenuator 22 whereby a "—40-decibel" signal, due to the attenuation of attenuator 22 alone, is applied to the standard input of the differential detector 20. As a consequence, each of the three dials on attenuator 19 will read "zero" as will be hereinafter explained.

Assuming further for the moment that (a) the apparatus under test 10 is still removed from the circuit of Fig. 1 and the short-circuiting strap of coaxial cable is still substituted therefor, (b) attenuator 12 of the unknown branch is on its "40-decibel loss" point, and (c) the attenuator 22 of the standard branch is on its "0-decibel loss"

point, then calibrated attenuator 19 of the unknown branch will actually include "20-decibel loss" (40-decibel loss in the attenuator 12, +20-decibel gain in modulator 16 and 20-decibel loss in attenuator 19) to compensate for +20-decibel gain in modulator 16 whereby a "—40-decibel" signal is applied to the unknown input of differential detector 20. At the same time, a "+20-decibel gain" in modulator 17 and a "20-decibel loss" in phase shifter 23 enable a "—40-decibel" signal due to the "40-decibel loss" in attenuator 12 to be applied to the standard input of differential detector 20. As a consequence the three dials of attenuator 19 will read "40-decibel loss" as will be hereinafter explained.

The three dials on attenuator 19 are adapted to show readings of "gain" or "loss" directly thereon as shown in Fig. 10 in the following manner. These dials are so arranged with two concentric sets of calibration numerals adjacent the periphery thereof that the outer set of numerals reads "gain" directly and the inner set reads "loss" directly. The outer calibration on each dial is stamped in red numerals adapted to be illuminated for indicating "gain" as will be hereinafter explained, in the forward direction as the dials are rotated in a counter-clockwise direction while the inner calibration is stamped in white numerals for indicating "loss," as will be subsequently described, in the reverse direction as the dials are rotated in a clockwise direction. In this connection, it will be noted that the outer calibration of the 10-decibel dial includes both red and white numerals as will be pointed out hereinafter. Thus, the three dials are arranged for so-called "reverse" reading of "loss." These calibration numerals will be illuminated for indicating gain or loss measurements as hereinafter explained in connection with Fig. 11. It will be noticed in Fig. 10 that the "10-decibel step" is omitted from the 1.0-decibel dial. The attenuator 19 and its three dials are calibrated as follows:

| 10 db dial—Actual db loss in attenuator 19 | 0 | 10 | 20 | 30 | 40 | 50 |
|---|---|---|---|---|---|---|
| Loss | 1 | 0 | | | | |
| Gain | | | 0 | 1 | 2 | 3 |
| Loss | 5 | 4 | 3 | 2 | 1 | 0 |

| 1.0 db dial—Actual db loss in attenuator 19 | 0 | 1 | 2 | 3 | 4 | 5 | 6 | 7 | 8 | 9 |
|---|---|---|---|---|---|---|---|---|---|---|
| Gain | 0 | 1 | 2 | 3 | 4 | 5 | 6 | 7 | 8 | 9 |
| Loss | 9 | 8 | 7 | 6 | 5 | 4 | 3 | 2 | 1 | 0 |

| 0.1 db dial—Actual db loss in attenuator 19 | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| Gain | 0 | .1 | .2 | .3 | .4 | .5 | .6 | .7 | .8 | .9 | 1.0 |
| Loss | 1.0 | .9 | .8 | .7 | .6 | .5 | .4 | .3 | .2 | .1 | 0 |

Thus, attenuator 19 will read as a maximum:

GAIN 30.0 db on the 10 db dial
9.0 db on the 1.0 db dial
1.0 db on the 0.1 db dial
———
40.0 db total

LOSS 50.0 db on the 10 db dial
9.0 db on the 1.0 db dial
1.0 db on the 0.1 db dial
———
60.0 db total The foregoing may be illustrated as follows:

| Setting of attenuator 12 | Light indication | Actual loss in attenuator 19: A being the reading of this attenuator |
|---|---|---|
| | | $db$ |
| Loss | Loss | $(60-A)$ |
| Gain | Gain | $(20+A)$ |
| Gain | Loss | $(20-A)$ |

An illuminating system shown in Fig. 11 is associated by electrical connection 33 in Fig. 1 with the three-dial attenuator 19 and attenuator 12, Fig. 1, to indicate by a red pilot lamp 200 that "gain" is being measured or by a white pilot lamp 201 that "loss" is being measured. In addition, a white lamp 200a and a white lamp 201a are positioned immediately in back of the red and white color designations of the numerical calibrations of the three dials of attenuator 19, Figs. 10 and 11 as hereinbefore mentioned. Accordingly, in a manner to be explained subsequently herein, the red pilot lamp 200 and corresponding red numerical calibrations on the dials of attenuator 19 visually indicate that "gain" is being measured; and the white pilot lamp 201 and corresponding white numerical designations on the dials of attenuator 19 visually indicate that "loss" is being measured. The circuit, as shown in Fig. 11, is arranged to indicate visually that "gain" measurements are being effected.

Referring now to Fig. 11, panel 202 associated with attenuator 12 includes a manually operated switch 203 for adjusting attenuators 12 and 22 via mechanical connection 32 to the "0-decibel loss" and "—40-decibel gain" positions, respectively, for measuring "loss"; or to the "—40-decibel gain" and "0-decibel loss" positions, respectively, for measuring gain. The switch 203 also connects via electrical connection 33, battery 204 to the lamps 200, 201, 200a and 201a, depending on whether loss or gain is being measured. A microswitch 207, i. e., a single-pole double-throw switch actuated by a cam not shown, attached to the shaft of the 10-decibel dial, Fig. 11, of attenuator 19 effects a change of lamps as the measurements go from "gain" to "loss," or vice versa, when the 20-decibel changeover point is passed in a manner that will presently appear. In achieving such measurements there is a point at which the measurements change from "gain" to "loss" and vice versa, whereby the lamps are caused to change from red 200 to white 201 and vice versa. The changeover point is determined by the "40-decibel loss" in attenuator 12 in the following manner.

Initially, the circuit constants of the unknown branch of Fig. 1 are preselected so that at all times, as above explained,

(10) $\dfrac{40\text{-decibel loss}}{\text{in attenuator 12}} + \dfrac{\text{gain or loss}}{\text{in apparatus}} + \dfrac{\text{attenuation}}{\text{of}} = 60 \text{ db loss}$
in the unknown branch, under test 10, attenuator 19 and of the standard branch of Fig. 1 are preselected so that at all times as above shown:

(11) 40-decibel loss in attenuator 12 in the standard branch + loss of phase shifter 23 = 60 db loss Thus, the "—60-decibel gain constants" of the unknown and standard branches of Fig. 1 enable a "—40-decibel gain" signal to be applied to the unknown and standard inputs of differential detector 20 as above mentioned.

EXAMPLE NO. 1

40-decibel loss in attenuator 12 + 0-decibel gain or loss of apparatus 10 + 20 decibels in attenuator 19 = 60 db loss Hence, the apparatus under test 10 has neither loss nor gain; and either red or white lamps 200 and 200a or 201 and 201a, respectively, are illuminated in Fig. 11.

EXAMPLE NO. 2

40-decibel loss in attenuator 12 + 1-decibel loss in apparatus 10 + 19 decibels in attenuator 19 = 60 db loss Hence, the apparatus under test 10 has a 1-decibel loss since 1-decibel attenuation must be removed from attenuator 19; and the white lamps 201 and 201a are illuminated in Fig. 11.

EXAMPLE NO. 3

40-decibel loss in attenuator 12 + 8-decibel loss in apparatus 10 + 12 decibels in attenuator 19 = 60 db loss Thus, the apparatus under test 10 has an 8-decibel loss since 8-decibel attenuations must be removed from attenuator 19; and the white lamps 201 and 201a are illuminated in Fig. 11.

EXAMPLE NO. 4

40-decibel loss in attenuator 12 + 1-decibel gain in apparatus 10 + 21 decibels in attenuator 19 = 60 db loss Thus, the apparatus under test 10 has +1-decibel gain since 1-decibel attenuation must be added to attenuator 19; and the red lamp 200 and white lamps 200a are illuminated in Fig. 11.

EXAMPLE NO. 5

40-decibel loss in attenuator 12 + 8-decibel gain in apparatus 10 + 28 decibels in attenuator 19 = 60 db loss Thus, the apparatus under test 10 has +8-decibel gain since 8-decibel attenuation must be added to attenuator 19; and the red lamp 200 and white lamps 200a are illuminated in Fig. 11.

Therefore, the "40-decibel" attenuator 12 insertable in the unknown branch in Fig. 1, in view of the over-all "40-decibel gain" and "60-decibel loss" measurable as previously pointed out, fixes the changeover in readings from "loss" to "gain" and vice versa at the −20 decibels normally in attenuator 19 whereat the apparatus under test 10 has neither loss nor gain as hereinbefore mentioned. Hence, when attenuator 19 includes actual attenuation of a value less than "20 decibels" the apparatus under test 10 has "loss" and the white lamps 201 and 201a are always illuminated in Fig. 11; and when attenuator 19 includes actual attenuation of a value above "20 decibels" the apparatus under test 10 has "gain" and the red lamp 200 and white lamps 200a are illuminated. Thus, the lamps in Fig. 11 change from red to white lamps, and vice versa, depending on whether attenuator 19 has more or less than "20 decibels" of actual attenuation. The microswitch 207 in Fig. 11 mounted on the shaft of the 10-decibel dial, Figs. 10 and 11, serves to effect the lamp changing mentioned hereinbefore.

Also, the three-dial attenuator 19 in Fig. 1 may be used to measure loss as follows:

| Setting of attenuator 12 | Loss in apparatus 10 | Actual loss in attenuator 19 | Readings on 3 dials of attenuator 19 |
|---|---|---|---|
| | Db | Db | Db |
| 0 | 00.0 | 60.0 | 00.0 |
| 0 | 60.0 | 00.0 | 60.0 loss |
| 0 | 35.6 | 24.4 | 35.6 loss |

Thus, the three dials of attenuator 19 will directly indicate "loss" in "reverse" reading.

In addition, the three-dial attenuator 19 in Fig. 1 measures gain or loss as follows:

| Setting of attenuator 12 | Gain in apparatus 10 | Actual loss in attenuator 19 | Readings on 3 dials of attenuator 19 |
|---|---|---|---|
| Db | Db | Db | Db |
| −40 | 00.0 | 20.0 | 00.0 |
| −40 | 40.0 | 60.0 | 40.0 gain |
| 0 | −20.0 | 40.0 | −20.0 loss |
| 0 | −10.0 | 50.0 | −10.0 loss |
| −40 | +20.0 | 40.0 | +20.0 gain |

To effect loss or gain measurements in Fig. 1, the attenuators 12 and 22 are initially adjusted to the "0-decibel loss" or "40-decibel loss" positions, respectively, for "loss" measurements, or to the "−40-decibel gain" or "0-decibel" positions, respectively, for "gain" measurements, with the apparatus under test 10 connected in circuit. The differential transmission detector 20b compares the signal outputs from the unknown and standard branches, and shows any difference therebetween on transmission indicator 25. For null measurements, attenuator 19 is adjusted to balance the unknown and standard signals until a zero-center reading is produced on indicator 25. The loss or gain of the apparatus under test 10 is read directly from the three dials on attenuator 19 in the manner previously explained. For apparatus under test 10 having gain, the actual attenuation of attenuator 19 increases as the gain of each apparatus increases so as to measure "gain," and for apparatus under test 10 having loss, the actual attenuation of attenuator 19 decreases as the loss of such apparatus increases so as to measure "loss."

*Example No. 1.*—Assume "0-decibel" gain or loss for apparatus under test 10, then (a) The attenuator 12 is adjusted to the "40-decibel loss" position while the attenuator 22 is adjusted to the "0-decibel loss" position;

(b) The white lamps 201 and 201a are illuminated;

(c) The attenuator 19 reads 0-0-0 on its 10-decibel, 1.0-decibel and 0.1-decibel dials, respectively, i. e., neither gain nor loss;

(d) The actual attenuation in attenuator 19 is 20 decibels so as to nullify the +20-decibel gain of modulator 16;

(e) The unknown branch has "40-decibel loss" comprising 40-decibel loss of attenuator 12, +20-decibel gain of modulator 16, and 20-decibel loss of attenuator 19; and (f) The standard branch has a 40-decibel loss comprising 40-decibel loss of attenuator 12 in unknown branch, +20-decibel gain of modulator 17, 20-decibel loss of phase shifter 23.

Therefore, the apparatus under test 10 has neither loss nor gain.

*Example No. 2.*—Assume +14.6-decibel gain for apparatus under test 10, then (a) The attenuator 12 is adjusted to the "40-decibel loss" positions while the attenuator 22 is adjusted to the "0-decibel gain" position;

(b) The red pilot lamp 200 and associated white lamps 200a are illuminated;

(c) The attenuator 19 reads 14.6-decibel gain (1 on the 10-decibel dial, 4 on the 1.0-decibel dial, and 0.6 decibel on the 0.1-decibel dial);

(d) The actual attenuation in attenuator 19 is 34.6 decibels comprising 30.0 decibels per the 10-decibel dial, 4 decibels per the 1.0-decibel dial and 0.6 decibel per the 0.1-decibel dial;

(e) The unknown branch as 40-decibel loss comprising 40-decibel loss of attenuator 12, +14.6-decibel gain of apparatus under test 10, +20-decibel gain of modulator 16, and 34.6-decibel loss of attenuator 19; and (f) The standard branch has 40-decibel loss as identified in paragraph (f) of Example No. 1.

Thus, the apparatus under test 10 is an active network.

Example No. 3.—Assume 10-decibel loss in the apparatus under test 10, then (a) The attenuator 12 is on the "0-decibel loss" position and the attenuator 22 is on the "40-decibel loss" position;

(b) The white lamps 201 and 201a are illuminated;

(c) The attenuator 19 reads 10-decibel loss (1 on the 10-decibel dial or 9 on the 1.0-decibel dial, +1.0 on the 0.1-decibel dial);

(d) The actual loss in the attenuator 19 is 50 decibels comprising 40 decibels on the 10-decibel dial, 9 on the 1.0-decibel dial and 1.0 decibel on the 0.1-decibel dial;

(e) The unknown branch has 40-decibel loss comprising "0-decibel gain" of the attenuator 12, 10-decibel loss in the apparatus under test 10, +20-decibel gain of modulator 16, and 50-decibel loss of attenuator 19; and (f) The standard branch has 40-decibel loss comprising 40-decibel loss of attenuator 22 in the unknown branch, +20-decibel gain of modulator 17, and −20-decibel gain in phase shifter 23.

Example No. 4.—Assume 54.9-decibel loss in the apparatus under test 10, then (a) The attenuator 12 is on the "0-decibel loss" position and attenuator 22 is on the "40-decibel loss" position;

(b) The white lamps 201 and 201a are illuminated;

(c) The attenuator 19 reads 54.9-decibel loss as follows: 50 decibels on the 10-decibel dial, 4 decibels on the 1.0-decibel dial and 0.9 decibel on the 0.1-decibel dial;

(d) The actual loss in the attenuator is 5.1 decibels comprising 0 decibel on the 10-decibel dial, 5 decibels on the 1.0-decibel dial and 0.1 decibel on the 0.1-decibel dial;

(e) The unknown branch has 40-decibel loss comprising 0-decibel loss in attenuator 12, 54.9-decibel loss in the apparatus under test 10, +20-decibel gain in modulator 16, and 5.1-decibel loss in attenuator 19; and (f) The standard branch has the 40-decibel loss as identified above under item (f) of Example No. 3.

In connection with the 1.0-decibel and 0.1-decibel dials of attenuator 19 shown in Fig. 10, it will be understood that each dial may include eleven steps in which event the maximum reading of the 1.0 and 0.1-decibel dials would be 10.0 decibels and 1.0 decibel, respectively, whereupon the maximum reading of the attenuator 19 would be 61.0 decibels; or that each of the 1.0-decibel and 0.1-decibel dials may include ten steps in which event the maximum reading of the 1.0-decibel and 0.1-decibel dials would be 9.0 decibels and 0.9 decibel, respectively, whereupon the maximum reading of the attenuator 19 would be 59.9 decibels. As a consequence, the circuit constants of Equations 10 and 11 would be 61.0 decibels for the 61.0-decibel attenuator and 59.9 decibels for the 59.9-decibel attenuator just mentioned.

(b) *For measuring phase shift*

To achieve phase measurements in Fig. 1 with the apparatus under test 10 connected in circuit, the phase difference may be read directly on phase indicator 21. For null measurements the calibrated phase shifter 23 is adjusted to provide a zero-center reading on phase indicator 21, and the amount of phase shift inserted by the apparatus under test 10 is read directly from the calibrated phase shifter 23. For these measurements, the first measuring step is to establish a zero for the over-all phase measuring system in Fig. 1 in the following manner. This is done by substituting a section of coaxial cable for the apparatus under test 10 in Fig. 1, or otherwise effectively substituting a short circuit for it, to achieve a null measurement. Next, phase shifter 23 is adjusted to establish a zero-center reading on phase indicator 21. Now the coarse and fine reading scales 137 and 148, respectively, associated with the phase shifter 23 in Fig. 12 are slipped via their respective friction clutches as described hereinafter in connection with Figs. 12, 13 and 14, until both scales show a zero reading. This constitutes the over-all zero for the phase measuring system of Fig. 1. As a second measuring step, the coaxial line section is replaced with the apparatus under test 10, and using the null procedure, the zero reading is reestablished on phase indicator 21 by appropriate adjustment of phase shifter 23. The amount of phase shift introduced by the apparatus under 10 is read directly from the coarse and fine scales 137 and 148, respectively, of the phase shifter 23 in Fig. 12. This obviates the need for adding or subtracting readings as would be required with scales incapable of the slippage above mentioned.

Modulators 16 and 17 are constructed such as to have identical gain-versus-frequency characteristics. They are also constructed such that a linear relationship exists between changes in the amplitude of the input waves of frequencies $f$ and $f_4$ and the amplitude of the output waves of the difference frequency $f_4-f$, or 31 kilocycles. Hence, by varying the amplitude of waves of frequency $f_4$ the outputs of modulators 16 and 17 may be changed by the same factor. The AVC connection shown in Figs. 1 and 8 maintains substantially constant the amplitude of the "standard" input into the differential detector 20, thus compensating the gain-frequency characteristic of modulator 15 and modulators 16 and 17, and changes in amplitude of waves of $f$ at the splitting pad 13 because of possible reflections from apparatus under test arising from impedance mismatch. This permits direct reading of the scales of the phase and transmission indicators 21 and 25, respectively, as herein described.

OPTICAL CAM FOR CALIBRATED PHASE SHIFTER 23 IN FIG. 1

As the calibration of phase shifter 23 includes residual error at different points, its calibrated scale would be non-linear if the deviations due to such error were incorporated therein. This would mean that the calibrated scale would be fixed relative to an arbitrary point on the shaft on which the latter is coaxially mounted, and once the scale is moved relative to such arbitrary point, the utility of the calibrated scale would be lost. In the calibration of phase shifter 23 as explained hereinbefore, its calibrated scale is made linear and is associated with a movable index representing the amount of its deviation from linearity due to residual error, in the manner that will now be described.

Referring to Fig. 12, phase shifter 23 comprising the well-known four-quadrant sine condenser having a rotor and stators is affixed to one end of shaft 130 on which is mounted spider 131, gear 132 and a transparent drum 133. Spider 131 shows in Fig. 13 an arm 134 attached rigidly at its center to the shaft 130 and adapted with a pair of shoes 135 on its opposite ends held in frictional engagement with the inner periphery of a drum 136 carrying on its outer periphery a scale 137 which contains thirty-six steps of 10 degrees each in linear form. The scale 137 provides a coarse reading of the effective phase shift of phase shifter 23 at a given instant. A compression spring 138 regulates the friction between the shoes 135, 135 and inner periphery of drum 136. Ring gear 139 engages spur gear 140 which can be actuated by a finger knob 141. Thus, rotation of knob 141 serves to rotate the coarse scale 137. A fixed index 141a is associated with coarse scale 137.

A worm gear 142 meshing with gear 132 is driven by a shaft 143 mounted in spur gear 144. The latter engages a further spur gear 145 connected rigidly to one end of a shaft 146 whose opposite end is terminated in a finger knob 147 which has fine scale 148 frictionally secured thereto and adapted with ten 1-degree divisions in a linear manner, representing one of the thirty-six 10-degree steps on coarse scale 137 as above mentioned. This frictional engagement is illustrated in Fig. 14 in which a friction plate 149 anchoring adjacent ends of spaced rods 150 and 151 whose opposite ends are fixedly mounted in a button 152. A compression spring 153 engaging an inner surface of button 152 serves to control the frictional engagement between the fine scale 148 and plate 149. By pushing button 152 in a right-hand direction, the pressure of friction plate 149 on fine scale 148 is released whereby the latter may be rotated relative to shaft 146 for a purpose that will later appear; and at the same time friction plate 149 engages panel 149a thereby locking shaft 146 against rotation.

Thus, as shown in Fig. 12, the phase shifter 23, a coarse scale 137 and a fine scale 148 are associated with the shaft 130. The gear ratio between the coarse and fine scales 137 and 148 is 1 to 36 whereby the fine scale 148 is caused to make thirty-six complete revolutions for each complete revolution of the coarse scale 137; or, in another aspect, the fine scale 148 makes one complete revolution for each 10-degree step of the coarse scale 137.

When the phase shifter 23 was calibrated in the manner hereinbefore explained, it was found that the 0-degree or 10-degree point of the fine scale 148 did not always fall on the same fixed index for each point calibrated. It so happened that the 0-degree or 10-degree point of the fine scale 148 tended to fall to the right or left of the fixed index as well as occasionally thereon. This meant that the phase shifter 23 had residual error which was peculiar to its adjustment at a given instant. Thus, the phase shifter 23 had a different index for different adjustments thereof whereby erroneous readings tended to result. As a consequence it was found necessary to provide a movable index for the fine scale 148 in order to compensate for the residual error of the phase shifter 23 in a manner that will now be described.

Referring again to Fig. 12, a negative photographic film 156 containing a calibration curve 157 of phase shifter 23 is affixed to the periphery of transparent drum 133 in a manner that will be mentioned later. A beam of light from light source 158 is focussed by lens 159 on a mirror 160 and projected thereby through the calibration curve 157. As a consequence, a relatively short and narrow strip of illumination 163 is projected onto frosted surface 161 of a transparent window 162 which is positioned in proximity of fine scale 148. Due to the opacity of film 156 at all points but the calibration curve, it is obvious that the light beam will pass only through the calibration curve 157 thereon. As the frosted surface 161 lies in the same vertical plane with that of the fine scale 148, no parallax exists between the latter and the projected portion of the calibration curve 157. It will be noticed that the beam of light emerges from the left-hand side of lens 159 in approximately parallel lines which is convenient but not necessary. It is only required that the divergence or convergence of the beam of light be unaltered after the calibration curve 157 is fixed on the transparent drum 133. Thus, the projected light beam 163 on the frosted surface 161 of the transparent window 162 provides a shifting zero which represents the residual error of phase shifter 23 for different adjustments thereof and which constitutes a moving index against which the fine scale 148 is read for achieving the measurement of insertion phase of apparatus under test 10 as hereinbefore described in connection with Fig. 1.

In making correction curve 157 in Fig. 12, a strip of transparent film or the like, not shown, is initially applied to the periphery of transparent drum 133, in the stead of film 156. As a starting point, the coarse and fine scales 137 and 148, respectively, are set at their zero points; and a suitable mark is made on the film and transparent drum 133 to indicate a point A common to each thereof, Fig. 12, for a purpose that will become evident subsequently. Thereafter, the phase shifter 23 is calibrated in the manner hereinbefore explained. In this calibration it is necessary to adjust the phase shifter 23 at each point calibrated so that the 0-degree or 5-degree or other scale division on fine scale 148 is referred to an index. Since the latter shifted or moved with reference to a fixed index for different calibrated points of phase shifter 23 as previously pointed out, an ink dot is now placed on the film in such a way that its projection onto the screen 161 is adjacent to the desired subdivision of the fine scale 148.

Thus, there will be an ink dot on the film for each calibrated point of phase shifter 23 to represent where the 0-degree or 10-degree point fell; and for the purpose of the present explanation, it is assumed that there will be an ink spot on the film, for example, at each of the thirty-six 10-degree steps calibrated on the coarse scale 137. Since the coarse scale 137, transparent drum 133 and fine scale 148 are actuated by the common shaft 130 as shown in Fig. 12, it will be evident that the transparent drum 133 makes one revolution for each revolution of the coarse scale 137 whereas the fine scale 148 made thirty-six revolutions for each revolution of the coarse scale 137 as previously mentioned.

Therefore, there will be at least thirty-six ink dots spaced along the length of the film on the transparent drum 133. Next, the film is removed from the transparent drum 133, then laid on a flat surface, and the ink dots thereon connected together by a reasonably heavy ink line with the aid of a so-called "French" curve. The connected ink dots will constitute a curve which is approximately sinusoidal for each of the four quadrants through which the rotor passes in calibrating the phase shifter 23 through 360 degrees. As a consequence, the over-all inked curve on the film will comprise essentially four sinusoidal curves connected together, each of the latter curves having a "hill" and a "valley" portion.

Finally, the over-all inked curve on the film is photographed and the negative thereof constitutes the film 156 on the transparent drum 133 while the four connected sinusoidal curves form the correction curve 157 on the film 156 in Fig. 12. The negative film 156 is applied to the periphery of transparent drum 133 so that the starting point "A" on the negative film 156 is disposed precisely at the starting point "A" on the transparent drum 133, Fig. 12. Thus, a relatively short and narrow strip of illumination 163 from the lamp 158 will pass through the correction curve 157, but will be blocked by the negative portion of the film 156 adjacent thereto. This strip of illumination 163 is projected onto the frosted surface 161 of the transparent window 162 and moves back and forth therealong to constitute the movable index for the fine scale 148 as above explained.

An important aspect of the foregoing optical correction curve is that both the coarse and fine scales 137 and 148, respectively, may be adjusted to any desired relation with respect to the rotor of phase shifter 23 and the correction curve 157 on the transparent drum 133. In this connection, it will be noted that the rotor of phase shifter 23 and the transparent drum 133 are rigidly positioned in fixed relation on the shaft 130 but the coarse scale 137 is rotatable relative to shaft 130 via spider 131 and the fine scale 148 is rotatable relative to shaft 136 via finger knob 147 and the plate 149 frictionally engaging the latter as pointed out previously. Hence, the coarse and fine scales 137 and 148, respectively, may be adjusted to any desired relative positions without disturbing the fixed relation between the correction curve 157 and the rotors of the phase shifter 23 in Fig. 12. The latter ensures that the proper amount of correction is made at the same adjusted positions of the rotor of the phase shifter 23 irrespective of the actual reading of the coarse and fine scales 137 and 148, respectively. Hence, it will be noted that the correction for residual error is associated with the rotor and not with the coarse and/or fine scales per se. Accordingly, the relative movement between the coarse and fine scales performs essentially an algebraic addition or subtraction depending on whether they are moved in a forward or backward direction. In other words, once the correction for the residual error of phase shifter 23 is established and maintained at all times, it is immaterial what arbitrary reading is given to the coarse and fine scales 137 and 148, respectively, at a given instant.

Fig. 15 shows a modification of Fig. 12 in that the former provides a correction curve 172 which is longer than but similar to the correction curve 157 in Fig. 12 and which may be useful in certain cases. Thus, Fig. 15 provides a correction curve 172 which may be contained on reels in the manner of film and which may be any length whereas the correction curve 157 according to Fig. 12 is fixed in length by the periphery of transparent drum 133. Referring to Fig. 15, engaging spur gears 166 and 167 are formed with a predetermined ratio and are substituted for the transparent drum 133 in Fig. 12. A shaft 168 has one end mounted in the spur gear 167 and its opposite end rigidly attached to transparent drum 169 which is similar to the transparent drum 133 in Fig. 12. Two sets of sprocket teeth 170 of the usual structure are disposed on the periphery of transparent drum 169 adjacent the opposite ends thereof, and are adapted to accommodate the two spaced sets of familiar apertures formed adjacent longitudinal edges of a film 171 carrying a correction curve 172 for the phase shifter 23. The remaining elements in Fig. 15 are identical with corresponding elements in Fig. 12. The film 171 in Fig. 15 may be of the endless type or stored in magazines as disclosed in the Slonczewski patent, supra.

Fig. 16 is an alternate embodiment of the arrangement of Fig. 12 in that the former includes a linear movement for effecting phase shift whereby the correction curve for residual error is caused to move in a linear direction. The arrangement of Fig. 16 may be substituted in Fig. 1 between the lines X—X and Y—Y. Referring to Fig. 16, a phase shifter 200 comprises a pair of conductors 201, 201, a slider pick-up 202, a termination 203, and an amplifier 204. Attached to slider pick-up 202 is one end of a pinion rack 205 whose opposite end is connected to a transparent member 206 on the surface of which is mounted correction curve 207, the latter being similar to correction curve 157 in Fig. 12. Immediately in front of the transparent member 206 is scale 148 which is mounted on a gear 209 meshing with gear 210. The latter meshes with gear 211 attached to one end of shaft 212 whose opposite end carries a pinion 213 meshing with pinion rack 205. Intermediate transparent member 206 and scale 148 is transparent window 162 provided with a frosted surface 161. Light source 158 and lens 159 are positioned rearwardly of transparent member 206. As the slider pick-up is moved along the conductors 201, a portion 213 of correction curve 207 is projected onto the frosted surface 161 to constitute a moving index for the scale 148, similarly to the projected light beam 163 in Fig. 12. In Fig. 16, it will be understood that phase shifter 200 is merely illustrative of one device for obtaining variable phase shift by linear motion of a controlling slider pick-up 202, and alternate devices will be immediately suggested to those skilled in the art.

Fig. 17 shows another arrangement utilizing an optical device for providing a movable index for a calibrated scale, and comprises a phase shifter 220 mounted on one end of shaft 221 which also includes gear 222 and transparent disk 223 carrying a correction curve 224, similar to correction curve 157 in Fig. 12. Meshing with gear 222 is a gear 225 attached rigidly to one end of shaft 226 whose opposite carries a calibrated scale 227. Positioned adjacent the latter scale is a transparent window 228 having a frosted surface 229. Associated with the window 228 is a light source 230 and lens 231. If desired, the scale 227 may include knob 232 connected to a clutch device, not shown, but similar to the clutch device associated with the scale 148 in Fig. 12 as previously described. In Fig. 17, scale 227 is similar to coarse scale 137 in Fig. 12 so that the movable index or projected light beam 233 in Fig. 17 on frosted surface 229 is similar to the projected light beam 163 in Fig. 12. Obviously, therefore, correction curves for the residual error of the phase shifter may be associated with both the coarse and fine scales thereof where desired.

Fig. 18 shows an optical arrangement for correcting deviations from a predetermined scale which may or may not be linear and which may be of a type disclosed in the patent of T. Slonczewski No. 2,058,641, issued October 27, 1936. Referring to Fig. 18, a film 240 contains a predetermined scale 241 and a correction curve 242, similar to correction curve 157 in Fig. 12. Immediately behind the predetermined scale 241 is a transparent window 243 with a frosted surface 244. Associated with the foregoing is an optical system 245 which comprises a light source 246, lens 247, 90-degree prism 248, dove prism 249, and 90-degree prism 250. As shown in Fig. 18, the dove prism 249 is tilted at 45 degrees, thus rotating the beam of light passing therethrough by 90 degrees about the axis thereof. As a consequence, a portion 252 of correction curve 242 is projected onto the frosted surface 244 to intersect base line 251 of the predetermined scale 241 thereby constituting a movable index for the latter scale as the film 240 is moved. Obviously, the predetermined scale 241 and correction curve 242 may be formed on different film, disposed in different planes or at right angles, moving together; and alternate optical systems of well-known types could be substituted for the optical system 245.

What is claimed is:

1. In combination with apparatus calibrated over a preselected range and including a predetermined scale formed substantially on a plane surface, said apparatus being operable over said range and deviating from said scale at at least one point in said range, means controlled by said apparatus over said range for indicating the deviation of said apparatus from said scale, said means comprising a corrective curve showing the deviation of said apparatus from said scale, and optical means for projecting different portions of said curve onto another substantially plane surface positioned in proximity of said scale, said plane surface for said scale and said plane surface for said projected curve portions being effectively disposed in one plane as regards readings of said scale as said apparatus is operated over said range, said projected corrective curve portions indicating the deviation of said apparatus from said scale over said range and thereby constituting a movable index against which said scale is read over the calibrated range of said apparatus.

2. In combination with apparatus calibrated over a preselected range and including a linear scale, said apparatus being operable over said range and deviating from said scale at at least one point in said range, means operable by said apparatus for providing a movable index for said scale whereby the deviation of said apparatus from said scale is indicated, and clutch means for normally connecting said scale to said apparatus, said clutch means being operable to disengage said scale from said apparatus for initially establishing an arbitrary reading on said scale with reference to said movable index and thereby with reference to the deviation of said apparatus.

3. In a phase shifting apparatus including a shaft for varying the phase shifting characteristic of said apparatus during the calibration thereof over a preselected range, a linear scale for said apparatus, and a movable index for said scale comprising clutch means for connecting said scale to said shaft, a correction curve representing the residual error of said apparatus and actuable under control of said shaft in a predetermined fixed relation with reference thereto, and optical means for projecting successive portions of said correction curve in proximity of said scale so that said scale is read against said projected curve portions over the calibrated range of said apparatus, said projected curve portions moving amounts corresponding to the residual error of said apparatus thereby constituting a movable index for said scale over the preselected calibrated range of said apparatus, said clutch means being operable to adjust said scale to any desired initial reading with relation to the projected curve portions and thereby with relation to any initial position of said shaft and said correction curve.

4. In phase shifting apparatus calibrated on a linear scale over a preselected range and including different amounts of residual error thereover, said scale lying substantially in one plane, a movable index for representing said residual error over said preselected range relative to said scale, said index comprising a correction curve representing the residual error of said apparatus over the preselected range of calibration and actuable by said apparatus, a light sensitive surface disposed adjacent said scale, and optical means for projecting successive portions of said curve onto said surface and into a plane thereof which is effectively coincident with the plane of said scale as regards readings thereof, said projected curve portions moving on said surface amounts corresponding to the residual error of said apparatus thereby constituting a movable index for representing the residual error of said apparatus.

5. In phase shifting apparatus comprising a shaft for operating said apparatus through a predetermined range of phase shift, said apparatus having different amounts of residual error over said calibration, a linear scale connected to said shaft and disposed substantially in one plane, a movable index for representing the residual error of said apparatus through said calibration, said index comprising transparent means connected fixedly to said shaft and actuable thereby, means mounted on said transparent means and containing a transparent correction curve for said residual error, said correction means being predeterminedly positioned on said transparent means in relation to the residual error of said apparatus, a screen disposed in proximity of said scale and having a surface positioned substantially in the plane thereof, and optical means for projecting a beam of light through successive portions of said transparent means and said correction curve and onto said screen surface so that said scale is read against said projected light beam substantially in one plane, said light moving on said screen surface to represent the residual error of said apparatus through its calibration thereby constituting a movable index for said scale.

6. In phase shifting apparatus comprising a shaft for actuating said apparatus over a predetermined calibrated range, said apparatus tending to possess different amounts of residual error for different positions of said shaft over said range, and a pair of scale for indicating the phase shift of said apparatus, means for automatically compensating said apparatus for the residual error therein, said means comprising one of said scales calibrated with a preselected number of linear rivisions, the other of said scales being linearly calibrated on a plane surface with one division of said one scale, clutch means for operatively connecting said one scale to said shaft;

further clutch means including a plurality of gears for operatively connecting said other scale to said shaft, said gears having a ratio predetermined by the preselected number of linear divisions on said one scale whereby said other scale is caused to make a preselected number of revolutions for each revolution of said one scale, said preselected number of revolutions of said other scale being equal to the preselected number of divisions on said one scale, a transparent drum fixedly mounted on said shaft, a film containing a correction curve of the residual error of said apparatus and applied to the periphery of said drum in a position predetermined by the residual error of said apparatus, a light source, a screen positioned adjacent said other scale, means for projecting a light beam from said source through successive portions of said drum and film and onto a plane surface of said screen as said shaft is rotated, said plane surfaces of said other scale and screen lying substantially in one plane, said projected light beam on said plane surface of said screen occupying different positions corresponding to the residual error of said apparatus and thereby constituting a moving index, against which said other scale is read, to compensate for the residual error of said apparatus, said first-mentioned clutch means being operable to provide said one scale with an arbitrary reading relative to a fixed index, said further clutch means being operable to provide said other scale with an arbitrary reading relative to said moving index.

7. In a system for measuring the magnitude of an electrical parameter of unknown electrical apparatus comprising a variable element including a shaft for effecting the actuation thereof, said variable element being calibrated through a predetermined range of values of said parameter and having different amounts of residual error over such range, at least one pair of linear scales connected to said shaft for indicating values of said parameter, a source of test waves, a differential detector, an indicator for said detector, circuit means for connecting said unknown apparatus and variable element in parallel branches to said test source and detector, said system being adjustable in response to the actuation of said variable element to measure the magnitude of said parameter of said unknown apparatus by a null reading on said indicator, said measurement being read directly from said scales, and a movable index for at least one of said scales, said index comprising a clutch means for connecting said scales to said shaft, transparent means fixedly mounted on said shaft, means applied to said transparent means in a predetermined position related to the residual error of said variable element, said last-mentioned means containing a transparent correction curve of the residual error of said variable element over said calibrated range, and optical means for projecting a beam of light through said transparent means and said transparent correction curve and into proximity of said one scale, said projected beam of light occupying different positions corresponding to the residual error of said variable element over said calibrated range thereby constituting a movable index against which readings of said one scale are made, said clutch means permitting said one scale to be moved relative to said movable index and the other of said scales to be moved relative to a fixed index for establishing on said scales and thereby in said system any desired initial reading prior to said adjustment of said system by the actuation of said variable element to said null reading on said indicator, the magnitude of said parameter of said unknown apparatus being measured directly by the reading of said scales after said adjustment of said system by the actuation of said variable element to said null reading on said indicator.

8. The system according to claim 7 in which a short circuit is initially substituted for said unknown apparatus in said circuit means, said variable element is then adjusted to provide a null reading on said indicator thereby establishing an initial zero reading for said system, and said clutch means permits said one scale to be adjusted to a zero reading relative to said movable index and the other of said scales to be moved to a zero reading relative to said fixed index whereupon said short circuit is removed and said apparatus is substituted therefor, said zero reading on said two scales constituting for said system said initial reading, said system being thereafter adjusted by the actuation of said variable element to said null reading on said indicator whereby the magnitude of said parameter of said unknown apparatus is measured directly by the reading of said scales.

9. In a circuit including an indicator for measuring the magnitude of an electrical parameter of an unknown element in terms of a variable standard element by adjustment of said variable standard element to successive balance conditions in the absence and presence, respectively, of said unknown element in said measuring circuit, means for establishing an arbitrary zero in said circuit, comprising means connected in said circuit in place of said unknown element, said variable standard element being adjusted to provide a null reading on said indicator and thereby an initial balance condition in said circuit, at least one scale on said variable standard element that is adapted to be disengaged therefrom and displaced to an arbitrary zero setting upon establishment of said initial balance condition in said circuit, the amount of adjustment of said variable standard element being related to said arbitrary zero setting on said scale as a measure of the magnitude of the electrical parameter of said unknown element when said last-mentioned element has replaced said second-mentioned means in said circuit and said variable standard element has been adjusted to repeat the null reading on said indicator.

10. In a circuit employing the substitution method for measuring the magnitude of an electrical parameter of an unknown element in terms of a variable element calibrated over a preselected range, said variable element including a linear scale and deviating from said scale at at least one point in said range, means for establishing an arbitrary zero in said circuit during the replacement of said unknown element therein and in response to adjustment of said variable element to provide a balance condition in said circuit, said means comprising means operable by said variable element for providing a movable index for said scale whereby the deviation from said scale is indicated, and clutch means for normally connecting said scale to said variable element, said clutch means being operable to disengage said scale from said variable element for establishing an arbitrary zero reading on said scale with reference to said movable index at the balance condition in said circuit, the amount of the adjustment of said variable element being related to the reading of said scale with reference to said movable index as a measure of the electrical parameter of said unknown element when said last-mentioned element has been reconnected in said circuit and said variable standard element has been adjusted to repeat the balance condition in said circuit.

DIETRICH A. ALSBERG.
ROBERT P. MUHLSTEFF.

REFERENCES CITED

The following references are of record in the file of this patent:

UNITED STATES PATENTS

| Number | Name | Date |
|---|---|---|
| 2,112,111 | McWeeny | Mar. 22, 1938 |
| 2,148,976 | Brailsford | Feb. 28, 1939 |
| 2,285,038 | Loughlin | June 2, 1942 |
| 2,373,168 | Cockerell | Apr. 10, 1945 |
| 2,448,473 | Shrewsbury | Aug. 31, 1948 |
| 2,452,587 | McCoy | Nov. 2, 1948 |
| 2,514,745 | Dalzell | July 11, 1950 |

FOREIGN PATENTS

| Number | Country | Date |
|---|---|---|
| 95,755 | Sweden | May 23, 1939 |